Jan. 23, 1962

W. D. ROWE

BINARY COUNTER WITH ISOLATION MEANS
BETWEEN FLIP-FLOP STAGES

Filed July 19, 1957

3,018,388

| State | Flip-Flop Circuits | | | | Signals |
|---|---|---|---|---|---|
| | 21 | | 22 | | |
| | 13 | 14 | 17 | 18 | |
| A | 1 | 0 | 1 | 0 | No Signal |
| B | 0 | 1 | 1 | 0 | Signal |
| C | 0 | 1 | 0 | 1 | No Signal |
| D | 1 | 0 | 0 | 1 | Signal |
| E | 1 | 0 | 1 | 0 | No Signal |
| F | 0 | 1 | 1 | 0 | Signal |
| G | 0 | 1 | 0 | 1 | No Signal |
| H | 1 | 0 | 0 | 1 | Signal |

INVENTOR
William D. Rowe
BY F. E. Browder
ATTORNEY

United States Patent Office 3,018,388

Patented Jan. 23, 1962

3,018,388
BINARY COUNTER WITH ISOLATION MEANS BETWEEN FLIP-FLOP STAGES

William D. Rowe, Snyder, N.Y., assignor to Westinghouse Electric Corporation, East Pittsburgh, Pa., a corporation of Pennsylvania Filed July 19, 1957, Ser. No. 672,903
9 Claims. (Cl. 307—88.5)

Figures 1, 2:
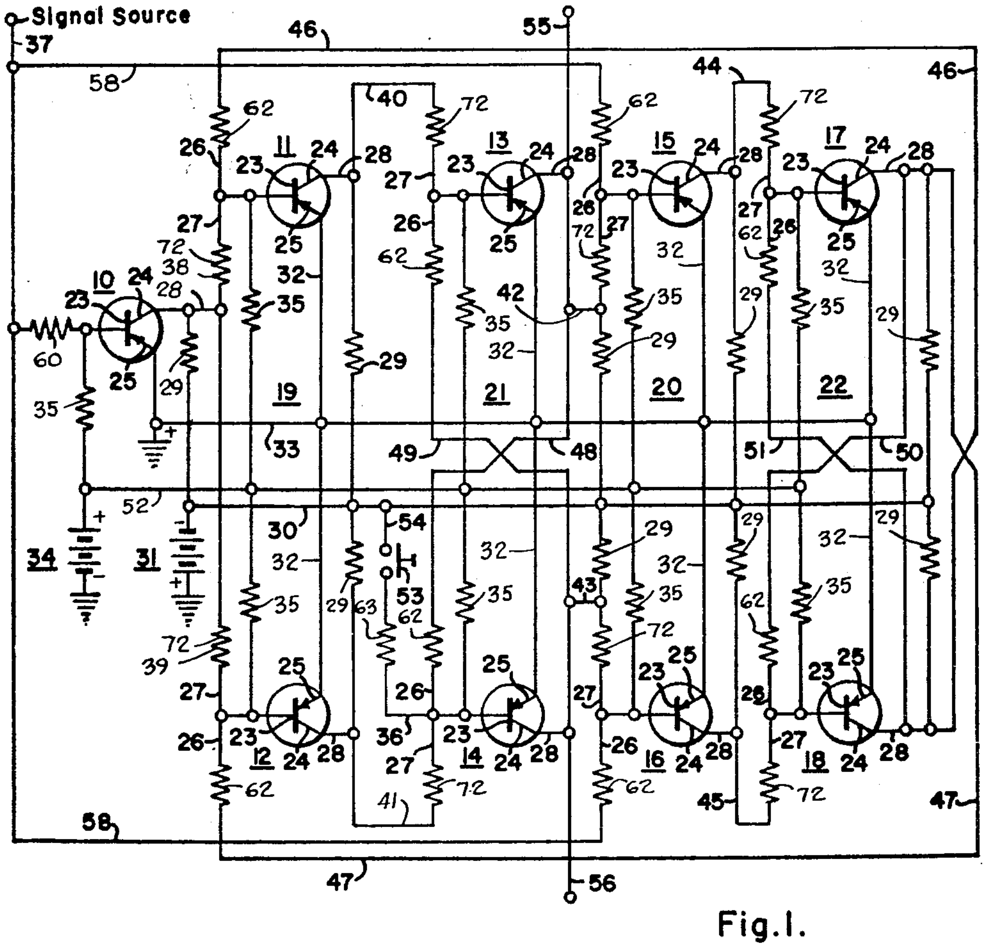

The invention relates generally to binary counters and more particularly to binary counters comprising NOR circuits connected to perform a counting operation.

The object of the invention is to provide for so connecting and utilizing a plurality of NOR circuits that a binary counting system results.

It is also an object of the invention to so connect a plurality of NOR circuits that a binary counter that responds to a wide range of signal pulse widths and rates is provided.

Other objects of the invention will, in part, be obvious and will, in part, appear hereinafter.

The invention accordingly comprises the features of construction, combination of elements and arrangement of parts which will be explained in the system hereinafter set forth and the scope of the application of which will be indicated in the claims.

For a fuller understanding of the nature and objects of the invention, reference should be had to the following detailed description taken in connection with the accompanying drawing, in which:

FIGURE 1 is a circuit diagram showing a plurality of temperature compensated NOR circuits so connected as to provide a binary counting system; and FIG. 2 is a chart showing different states through which the binary counter system passes in performing counting operations.

Referring now to the circuit diagram, the binary counter comprises nine NOR circuits shown generally at 10 to 18, inclusive. The construction and functioning of a NOR circuit is hereinbelow defined and described and has been defined and disclosed in detail in applicant's copending patent application Serial No. 628,332, filed December 14, 1956.

Binary counters of this type, are often subjected to a wide range of temperatures due to environment and consequently subjected to temperatures which may affect the characteristics of the NOR circuit. Therefore, it may be desirable in certain binary counting systems to employ temperature compensated NOR circuits such as are described in applicant's copending patent application Serial No. 628,331, filed December 14, 1956.

In connecting the NOR circuits, or temperature compensated NOR circuits, to provide the binary counter circuit system, pairs of NOR circuits such as 11 and 12 and 15 and 16 are connected in circuit relationship to provide isolation circuits shown generally at 19 and 20. These isolation circuits will be described in detail as the specification proceeds.

The pairs of NOR circuits 13 and 14, and 17 and 18 are connected in circuit relationship to provide flip-flop circuits shown generally at 21 and 22. Flip-flop circuits comprising a plurality of NOR circuits are described in applicant's copending patent application Serial No. 628,330, filed December 14, 1956.

A NOR circuit comprises a transistor having a plurality of like input circuits and one or more like output circuits. Consider, for example, the NOR circuit shown generally at 11. It will be observed that it comprises a transistor having a base 23, a collector 24 and an emitter 25. Two input leads, or connections, 26 and 27 are provided for delivering input current signals to the base 23, the base being the principal input terminal.

A temperature compensating voltage is provided from battery 34 to the base through the resistor 35 the resistance value of which preferably decreases somewhat with a rise in temperature. The voltage of battery 34 is chosen to be substantially equal to the voltage of battery 31. Since the leakage current from the collector to the base inherently increases with a rise in temperature it is apparent that resistor 35 blocks any appreciable leakage current and this coupled with the back voltage of battery 34 provides for temperature compensation, which compensation may even be improved if the resistance characteristic of resistor 35 is so chosen that the resistance value decreases somewhat with a rise in temperature.

The transistor of a NOR circuit may have a plurality of inputs. For example, the NOR circuit 14 is provided with three inputs, not counting the temperature compensation, namely the inputs from leads 26, 27 and 36. The requirements in each case dictate the number of inputs used. All of the NOR circuits have exactly the same elements and connections, but only one input is used at NOR element 10, three inputs are used at NOR element 14, and two inputs at each of the other seven NOR elements. Each NOR circuit will have a power source 31 connected to the collector 24 through conductor 30 and a resistor 29. The output of the collector 24 for the transistor of NOR circuit 11 is connected through conductor 28 to lead 40. While but one output circuit is connected to collector 24, any number from one to as many as ten may be so connected. For example, the transistor of NOR circuit 14 is shown connected to three output circuits, namely, leads 43, 49 and 56. The emitter 25 is connected through conductor 32 to a trunk line 33 which is connected to a common return to which is also connected the positive terminal of the power source 31.

In this particular diagram, instead of providing each transistor with a power source, the resistor 29 of each transistor is connected to a trunk line 30, which, in turn, is connected to the negative terminal of a power source shown generally at 31. In this particular instance, the power source is a storage battery.

The temperature compensating device is a resistor 35 connected to the positive terminal of power source 34 and the base of the transistor for each stage. The temperature compensating device functions as herein stated and described in more detail in the copending application identified hereinbefore.

The NOR circuits 13 to 18, inclusive, have substantially the same elements and connections described for NOR circuit 11. Further, NOR circuit 10 is much the same as NOR circuit 11 with the exception that only one input circuit, not counting the temperature compensating input, is provided in this embodiment of the invention. The NOR circuit 10, disposed to be connected to the signal source 37 through resistor 60, is to be utilized as an inversion circuit to receive and transmit signals, and it thus uses only one input circuit.

In view of the fact that all of the NOR circuits are identical except for the number of inputs used, and in order to simplify the description of the binary counter circuit system, like elements in the different NOR circuits will be given corresponding numbers and will be identified when it is necessary to refer to a particular element by giving the number of the element and the NOR circuit system to which it belongs.

It will be observed that in this modification of the invention the isolation circuit system 19 comprises two NOR circuits 11 and 12 disposed opposite to one another and connected in a predetermined circuit relationship. The isolation circuit system 19 is connected to the output at 28 of the NOR circuit 10 which receives signals from the signal source.

The term isolation circuit is applied to the circuit system comprising the NOR circuits 11 and 12, since it is disposed between the flip-flop circuit system 21 and the NOR circuit system 10, and a signal received and transmitted through the NOR circuit 10 must go through the isolation circuit system 19 before it can reach the flip-flop circuit system 21. Therefore, all signals received through the NOR circuit 10 are modified before they reach the flip-flop circuit system 21.

The isolation circuit system 20 is connected between the flip-flop circuit systems 21 and 22. It isolates one flip-flop system from the other, and signals have to be passed through the isolation circuit system 20 before they can reach the flip-flop circuit system 22.

The binary counter system in this modification of the invention comprises two isolation circuit systems 19 and 20 and two flip-flop circuit systems 21 and 22. As shown, they are connected in an alternate arrangement with the isolation circuit system 19 in a position which may be described as leading, since it is next to the NOR circuit system 10 and responds to certain signals first, for example, if no impulse is received, the NOR circuit 10 will deliver an output, and an input will be delivered to the NOR circuits 11 and 12.

The flip-flop circuit system 21 follows the isolation circuit system 19. Then the isolation circuit system 20 is connected after the flip-flop circuit system 21 and precedes the flip-flop circuit system 22.

The isolation circuit system 20, comprising the NOR circuits 15 and 16, has input lead 26 of each of the two NOR circuits connected through resistor 62 to the lead 37 provided for receiving signals from the signal source, not shown. Therefore, when a pulse is delivered, it will be delivered to the NOR circuit 10 and the NOR circuits 15 and 16.

Referring now to the NOR circuit 10, it will be observed that its output lead 28 is connected through resistors 72 and 72 to the input leads 27 of the NOR circuits 11 and 12, respectively, of the isolation circuit system 19.

In connecting the isolation circuit system 19 to the flip-flop circuit system 21, the output lead 28 of the NOR circuit 11 is connected through conductor 40 and resistor 72 to the input lead 27 of the NOR circuit 13. Further, the output lead 28 of the NOR circuit 12 is connected through conductor 41 and resistor 72 to the input lead 27 of the NOR circuit 14. In this manner, the isolation circuit system 19 is connected to the flip-flop circuit 21 to control the signals delivered to the latter.

The flip-flop circuit system 21 is connected to the isolation circuit system 20 by connecting the output lead 28 of the NOR circuit 13 through conductors 48 and 42 and resistor 72 to the input lead 27 of the NOR circuit 15, and the output lead 28 of the NOR circuit 14 through conductors 49 and 43 and resistor 72 to the input lead 27 of the NOR circuit 16. Therefore, the isolation circuit system 20 can receive currents from the flip-flop circuit system 21 as well as from the signal source 37 through inputs 26 of each of its NOR circuits.

The output leads 28 of the NOR circuits 15 and 16 are connected through conductors 44 and 45, and resistors 72 to the respective input leads 27 of the NOR circuits of the flip-flop system 22. Thus, for a signal to reach the flip-flop circuit 22, it must pass through the isolation circuit system 20.

The output lead 28 of the NOR circuit 18 is connected through conductor 46 and resistor 62 to the input lead 26 of the NOR circuit 11 of the isolation circuit system 19. The output lead 28 of the NOR circuit system 17 is connected through conductor 47 and resistor 62 to the input lead 26 of the NOR circuit 12 of the isolation circuit system 19.

The flip-flop circuit system 21 has the lead 28 of the NOR circuit 13 ronnected through conductor 48 and resistor 62 to the input lead 26 of the NOR circuit 14.

The output lead 28 of the NOR circuit 14 is connected through conductor 49 and resistor 62 to the input lead 26 of the NOR circuit 13.

The flip-flop circuit system 22 has the output lead 28 of the NOR circuit 17 connected through conductor 50 and resistor 62 to the input lead 26 of the NOR circuit 18. The output lead 28 of the NOR circuit 18 is connected through conductor 51 and resistor 62 to the input lead 26 of the NOR circuit 17.

It will be noted that a resistor is shown connected in each of the input leads, of all the NOR circuits 10 to 18 inclusive. These resistors are part of each input of each NOR circuit and are for the purpose of limiting the amount of current flow and do not perform any other particular function in the binary counter system.

The temperature compensating resistors 35 described hereinbefore are all connected to the trunk line 52, which is connected to the positive terminal of the power source 34. Another feature is that the input lead 36 of the NOR circuit 14 is connected through a resistor 63, a switch 53, and conductor 54 to the trunk line 30 and thus to the negative terminal of the power source 31.

Two leads 55 and 56 are connected to the output leads 28 of the NOR circuits 13 and 14, respectively. These leads are provided for taking off signals or currents from the output leads of the NOR circuits 13 and 14 to operate registering equipment or to deliver signals to other circuit systems.

The elements of the system have been described in detail, and reference has been made to copending applications which give slightly more specific descriptions of the NOR circuit and the flip-flop circuit system. In the description given hereinbefore, the two flip-flop circuit systems have been identified generally by the numerals 21 and 22. Among those skilled in binary counting systems, the flip-flop circuit systems 21 and 22 are sometimes known as the lower and upper units of the system.

This modification of the binary counter system has been designed to count with a radix, or number base, of 2. The numerals selected for the base 2 are 0 and 1.

Assuming now that in considering the operation of the binary counting system that no impulse is being received through the lead 37 of the NOR circuit 10. In NOR circuit systems, when there is no input, there will be an output. If there is no signal or input through the lead 37 to the NOR circuit 10, there will be an output through the output lead 28.

The output from the inversion or NOR circuit 10 will be delivered through conductor 28 and resistor 72 to the input lead 27 of the NOR circuit 11 and through resistor 72 to the input lead 27 of the NOR circuit 12. The input delivered through the input lead 27 of the NOR circuit 11 will effect a change in the state of the NOR circuit 13.

When there is an input to the NOR circuit 11 there will be no output from lead 28. If there is no output from lead 28 there is no input through conductor 40 and input lead 27 to the NOR circuit 13. When the NOR circuit 13 does not receive an input there will be an output. Therefore, unless NOR circuit 13 receives an input through lead 26 it will deliver an output. Whether or not there is an output from the NOR circuit 13 will depend on the state of the NOR circuit 14.

As pointed out hereinbefore, when there is an output from the inversion circuit 10, a signal is delivered through resistor 72 to the input lead 27 of the NOR circuit 12. When there is an input to the NOR circuit 12 there will be no output through output lead 28. If there is no output through lead 28 there will be no input through conductor 41 and lead 27 of the NOR circuit 14. The rule is that if there is no input there is an output. Therefore the state of the NOR circuit 14 will depend on whether or not it receives signals through the leads 26 and 36.

As has been described hereinbefore, the NOR circuits 13 and 14 do not receive signals through leads 27, and consequently both circuits, unless they receive signals through other leads, should deliver an output through their leads 28. In describing the circuit systems it was pointed out that the output lead 28 of NOR circuit 13 is connected to the input lead 26 of NOR circuit 14 through conductor 48 while the output lead of NOR circuit 14 is connected to the input lead 26 of NOR circuit 13 through conductor 49. In other words, the NOR circuits 13 and 14 are cross connected, making the flip-flop circuit shown generally at 21. Therefore it is impossible to tell which of the two NOR circuits 13 and 14 will deliver an output first when no signal is being received through input lead 37 of the inversion or NOR circuit 10.

Assuming that NOR circuit 13 is the first to deliver an output through the output lead 28, then an input signal will be delivered through the lead 26 of the NOR circuit 14. In such case, NOR circuit 14 would receive a signal through input lead 26 and therefore would not deliver an output. However, there is a possibility that through some internal condition in the circuit that the NOR circuit 14 may deliver an output first. In such case, NOR circuit 13 would receive a signal through conductor 49 and lead 26 and consequently would not deliver an output.

In order to avoid any uncertainty as to which of the NOR circuits 13 and 14 delivers an output through its lead 28 first, the pushbutton switch 53 will be closed momentarily, causing a signal to be delivered through the input lead 36. When a signal is delivered through input lead 36 the NOR circuit 14 will not deliver an output. Consequently, no signal will be delivered through output lead 28 of the NOR circuit 14 and conductor 49 to the input lead 26 of the NOR circuit 13.

As has been described, the NOR circuit 13 does not receive an input through either of its leads 26 or 27. Therefore it will deliver an output through the output lead 28. Since the output lead 28 of NOR circuit 13 is connected to the input lead 26 of NOR circuit 14, the latter will receive a signal from NOR circuit 13 and will not deliver an output. Therefore, the flip-flop circuit 21 is in a stable state with the NOR circuit 13 delivering an output and NOR circuit 14 not delivering an output.

The isolation circuit 20 controls the signals that are delivered to the flip-flop circuit 22. When the NOR circuit 13 is delivering an output, a signal is delivered through conductor 42 and lead 27 to the NOR circuit 15. When an input is received by NOR circuit 15 it does not deliver an output through lead 28. Therefore no signal is delivered to NOR circuit 17 through conductor 44 and its input lead 27. If NOR circuit 17 does not receive an input through input lead 26 it will deliver an output.

It has been shown that the NOR circuit 14 receives a signal or an input and does not deliver an output through its lead 28. Therefore the NOR circuit 16 does not receive an input and consequently delivers an output which flows through its output lead 28, conductor 45 and input lead 27 of the NOR circuit 18. Since the NOR circuit 18 receives an input it does not deliver an output. This means that NOR circuit 17 does not receive a signal through input lead 26 and so delivers an output.

When NOR circuit 17 is delivering an output, a signal will be delivered through conductor 50 to the input lead 26 of the NOR circuit 18. Therefore NOR circuit 18 receives two signals, one through input lead 27 from the NOR circuit 16 and the other through input lead 26 from the NOR circuit 17.

At this point in the operation of the binary counting system the flip-flop circuits 21 and 22 will be in the state A illustrated in the chart shown in FIG. 2. The number 1 indicates that NOR circuits 13 and 17 are delivering outputs while NOR circuits 14 and 18 are not. Therefore, when the circuit system is not receiving a signal through lead 37 from the signal source and the reset lead 53 has been operated to deliver a signal, a stable state in the binary counting system is established.

In stable state A described, the NOR circuit 12 receives a signal or input through its input lead 26. This signal comes from the output lead 28 of NOR circuit 17 and conductor 47. It will continue as long as the NOR circuit 17 delivers an output.

When the binary counting system stands in state A indicated in the chart, a signal will be delivered through the lead 55. This signal may be delivered to another binary counter or to any suitable mechanism for registering the count. Mechanisms for registering counts in response to such signals are well known in the art and need not be described.

Assume now that a pulse or signal is delivered from the signal source through the input lead 37 to the inversion or NOR circuit 10. Then since there is an input there will be no output. Consequently there will be no input to NOR circuit 11 through input lead 27. It has been shown that at this point NOR circuit 18 is not delivering an output and consequently there will be no input through lead 26 of the NOR circuit 11. Since there is no input through either of the leads 26 or 27, the result is that there will be an output from the NOR circuit 11 through output lead 28. The output from NOR circuit 11 will be delivered through conductor 40 to the input lead 27 of the NOR circuit 13. Since there is an input to NOR circuit 13 there will be no output. Therefore there has been a reversal in the state of the NOR circuit 13.

The NOR circuit 14 may be affected by signals from either the inversion circuit 10 or the NOR circuit 17. In the case of NOR circuits it is the signal delivered through the input lead that controls the state of the circuit.

When the NOR circuit 10 receives a signal there is no output and no output from NOR circuit 10 means no input to NOR circuit 12. Therefore, if there is no input signal to NOR circuit 12 through lead 27 there will be an output. However, this is not the only lead through which an input signal may be delivered to NOR circuit 12. The output lead of NOR circuit 17 is connected to the input lead 26 of NOR circuit 12. Since in state A NOR circuit 17 is delivering an output, an input will be received through input lead 26 by the NOR circuit 12. When a NOR circuit receives an input there is no output. Therefore, NOR circuit 12 will not deliver an output and NOR circuit 14 will not receive an input through conductor 41 and input lead 27. As already described, NOR circuit 13 has been driven to a state in which it is not delivering an output. Therefore, there will be no input delivered to NOR circuit 14 through conductor 48 and input lead 26. The condition that now exists is that NOR circuit 14 does not receive an input through any of its leads 26, 36 or 27. Therefore, NOR circuit 14 will deliver an output.

When a signal is delivered through lead 37 to the inversion circuit 10, there is a complete reversal of phase of the flip-flop circuit system 21. NOR circuit 13 ceases to deliver an output and NOR circuit 14 delivers an output. The binary counting circuit is now in state B of the chart. The NOR circuit 13 is standing at zero and NOR circuit 14 at one. There has been no reversal of phase of the flip-flop circuit 22 from state A and consequently 17 stands at one and 18 at zero.

The complete reversal of phase of flip-flop circuit system 21 will result in the delivery of a signal through lead 56. This signal will function in the same manner as the signal delivered through lead 55 to effect the operation of a counting mechanism or the delivery of a signal to another binary counting system.

If the signal from the signal source through lead 37 is interrupted, there will no longer be inputs delivered to the NOR circuits 15 and 16 through leads 26. The isolation circuit 20 prevented the signal from causing a reversal of phase in the flip-flop circuit 22 when a reversal occurred in flip-flop circuit system 21.

At the instant when the signal from the signal source through lead 37 is interrupted the NOR circuit 14 is delivering an output. When NOR circuit 14 delivers an output a current flows through output lead 28, conductor 49 and input lead 26 to the NOR circuit 13. Input signals are controlling and NOR circuit 13 is not delivering an output.

Now unless the interruption of the signal through lead 37 changes the state of NOR circuit 14 it will continue to deliver an output to NOR circuit 13. The delivery of an input to NOR circuit 13 will prevent it from delivering an output.

When there is not input to NOR circuit 10 there will be an output. Therefore there will be an input delivered through resistor 72 to the input lead 27 of NOR circuit 12. An input to NOR circuit 12 means no output. Therefore there will be no current delivered through conductor 41 and input lead 27 to NOR circuit 14. No input through lead 27 to NOR circuit 14 means an output unless there is an input through leads 26 or 36. There will be no input through lead 36 unless switch 53 is actuated. It has been shown that NOR circuit 13 is not delivering an output at the time the signal is interrupted and consequently NOR circuit 14 does not receive an input through lead 26. Therefore the interruption of the signal does not change the condition or state of NOR circuit 14. Consequently, NOR circuit 14 will keep NOR circuit 13 in the state it was in when the signal was interrupted.

The only conditions that can affect the flip-flop circuit system 22 now are the outputs that may be delivered by the flip-flop circuit system 21 In the preceding description, it has been pointed out that the NOR circuit 13 was not delivering an output at the time when the signal through lead 37 was interrupted. Therefore there will be no signal to the NOR circuit 15 through the input lead 27 If there is no input through leads 26 or 27 of NOR circuit 15, there will be an output. When there is an output from NOR circuit 15 there will be an input to the NOR circuit 17 through conductor 44 and input lead 27 When there is an input to NOR circuit 17 there will be no output through lead 28.

The NOR circuit 14 is delivering an output through lead 28 Therefore there will be a signal flow from NOR circuit 14 through conductor 43 to input lead 27 of NOR circuit 16. An input to NOR circuit 16 results in no output through output lead 28. Consequently there will be no input through lead 27 to NOR circuit 18. If there is no input through lead 27 to NOR circuit 18 there will be an output if there is no other input signal. As conditions stand, NOR circuit 17 is not delivering an output, therefore, there is no input to NOR circuit 18 through lead 26 Since both leads 26 and 27 of the NOR circuit 18 are free from inputs, it will produce an output. Since the output lead 28 of NOR circuit 18 is connected through conductor 51 to the input lead 26 of NOR circuit 17, the latter will receive an input through lead 26. Therefore, NOR circuit 17 is receiving input signals through both leads 26 and 27 and will not deliver an output.

There has been a reversal in phase in the flip-flop circuit system 22. The binary counter system is now in state C of the chart. The NOR circuit 17 stands at zero and the NOR circuit 18 at one. NOR circuit 18 will deliver an output through lead 28 and conductor 46 to the input lead 26 of the NOR circuit 11. An input through lead 26 of NOR circuit 11 will drive the NOR circuit 11 to a state where it delivers no output.

Further, since the signal through lead 37 has been interrupted, there will be no input to the inversion circuit 10 and it will deliver an output through lead 28. The output from the inversion circuit 10 will be delivered through conductor 38 and input lead 27 of the NOR circuit 11. Since NOR circuit 11 is receiving input signals through both leads 26 and 27, it will no longer deliver an output. Therefore NOR circuit 13 will not receive an input through input lead 26 from NOR circuit 11. However, as pointed out hereinbefore the NOR circuit is receiving a signal from NOR circuit 14 which is controlling and NOR circuit 13 will not deliver an output.

Assuming now that a signal is again delivered from the signal source, through the input lead 37, then NOR circuit 10 will receive an input and so will NOR circuits 15 and 16. The input to NOR circuit 10 will be considered first. An input to NOR circuit 10 means no output through output lead 28, and therefore no input through conductor 26 and input lead 27 of NOR circuit 11. It has already been established that NOR circuit 18 is delivering an output at this time as in state C and that there will be an input to NOR circuit 11 through input lead 26. Since NOR circuit 11 receives an input through its input lead 26 which is controlling, there will be no output. If there is no output from NOR circuit 11 through output lead 28 then there is no input through conductor 40 and input lead 27 to NOR circuit 13. Therefore NOR circuit 13 will deliver an output unless it receives an input through lead 26.

When there is a signal through lead 37, and NOR circuit 10 is not delivering an output, there will be no current flow through output lead 28, and resistor 72 to the input lead 27 of the NOR circuit 12. Since NOR circuit 17 is not delivering an output, NOR circuit 12 is not receiving an input through either of its leads 26 or 27. This means that NOR circuit 12 will deliver an output. When NOR circuit 12 delivers an output there will be current flow through output lead 28, conductor 41 to input lead 27 of the NOR circuit 14. The input signal to NOR circuit 14 is controlling and NOR circuit 14 will cease to deliver an output.

NOR circuit 14 has now reached a condition where it receives an input and therefore does not deliver an output. When NOR circuit 14 ceases to deliver an output, NOR circuit 13 will not receive a signal through input lead 26. It has been established that NOR circuit 13 does not receive an input through lead 27. Therefore, NOR circuit 13 will deliver an output. There has been another reversal of phase in the flip-flop circuit system 21 and a signal will be delivered through lead 56. The circuit is now in state D of the chart in FIG. 2.

The signal received through lead 37 will also be delivered, through leads 58 and resistors 62, to the input leads 26 of the NOR circuits 15 and 16. The isolation circuit system 20 prevented the signals through leads 58 from changing the state of the flip-flop circuit 22.

In state D the flip-flop circuit system 22 remains the same as in state C. Therefore, NOR circuit 18 delivers an output. When NOR circuit 18 delivers an output NOR circuit 17 receives a signal through input lead 26 which is controlling and consequently NOR circuit 17 does not deliver an output. The signal delivered from lead 37 through conductor 58 to the input lead 26 of NOR circuit 15 dominates and NOR circuit 15 does not deliver an output. When there is no output from NOR circuit 15 through lead 28, there is no signal through conductor 44 to input lead 27 of the NOR circuit 17. However, the NOR circuit 17 does receive an input through input lead 26 from NOR circuit 18. This latter input signal is controlling and NOR circuit 17 does not deliver an output. When there is a signal imposed on lead 37 it flows through conductor 58 to the input lead of NOR circuit 16. The input signal to NOR circuit 16 is controlling and the latter circuit does not deliver an output. If the NOR circuit 16 does not deliver an output there is no input to NOR circuit 18 through to input lead 27. It has been established that NOR circuit 17 does not deliver an output, therefore, NOR circuit 18 does not receive an input through either of its leads 26 or 27 and will continue to deliver an output. Therefore, when a signal is delivered NOR circuit 18 remains in the state D of the chart and continues to deliver a signal maintaining NOR circuit 17 in the state where it does not deliver an output.

There is no change in the state of the binary counting system until the signal through input lead 37 is interrupted. The next step in the operation is the interruption of the signal which effects a reversal in phase of the flip-flop circuit system 22.

As soon as the interruption of the signal occurs, the input through leads 26 of the NOR circuits 15 and 16 will be interrupted. The only signals that the flip-flop circuit system 22 will receive will be from the flip-flop circuit system 21 through the isolation circuit system 20.

It has been established that when there is no signal that there will be no input through input lead 27 of the NOR circuit system 13. It has also been shown that there is no output from the NOR circuit system 14. Therefore, the NOR circuit system 13 does not receive an input through either of its input leads 26 or 27. Consequently, it will deliver an output. An output through the output lead 28 of the NOR circuit system 13 means an input through conductor 42 and input lead 27 of the NOR circuit system 15. This input to the NOR circuit system is controlling and the NOR circuit system 15 does not deliver an output. Therefore, NOR circuit system 17 will not receive an input through conductor 44 and input lead 27.

The next circuit to consider will be the input to NOR circuit system 18. When the signal has been interrupted there will be an output from NOR circuit system 10 which means an input to NOR circuit system 12 through its input lead 27. The input signal through lead 27 is controlling and NOR circuit 12 will not deliver an output. Therefore there will be no input through conductor 41 and lead 27 to NOR circuit 14. However, it has been established that NOR circuit 13 is delivering an output. Consequently, NOR circuit 14 will receive an input through conductor 48 and input lead 26 from NOR circuit 13. The input signal is controlling and NOR circuit 14 will not deliver an output. When NOR circuit 14 does not deliver an output NOR circuit 16 will not receive an input through its input lead 27. Since there is no signal being received through lead 37, there will be no input through conductor 58 and input lead 26. When NOR circuit 16 does not receive an input it delivers an output through conductor 45, lead 27 to the NOR circuit 18. Under such conditions the NOR circuit 18 ceases to deliver an output and no longer delivers a signal to NOR circuit 17 through conductor 51 and input lead 26 of the latter. The condition that exists now is that NOR circuit 17 does not receive an input through either of its leads 26 or 27 and will begin to deliver an output. There has now been a reversal in phase of the flip-flop circuit 22 as shown in state E of the chart.

When reversal of phase of flip-flop circuit 22 occurs, NOR circuit 17 will deliver a signal to NOR circuit 18 and NOR circuit 12. The signal delivered to NOR circuit 12 will make no change since NOR circuit 12 is already receiving a signal through its input lead 27 from the NOR circuit 10.

The binary counter remains in a stable state until another signal is received. The delivery of a signal from the signal source through the lead 37 will make a change in the flip-flop circuit 21. The delivery of a signal through the lead 37 also effects the delivery of signals to the NOR circuits 15 and 16 as described hereinbefore. The signal to NOR circuit 15 is controlling and maintains this NOR circuit in the state to which it was driven by NOR circuit 13. Therefore, there will be no change in the state of NOR circuit 17 and it will continue to deliver a signal to NOR circuit 18. The signal delivered to NOR circuit 18 by NOR circuit 17 is controlling and there will be no change in state in the NOR circuit 18.

The delivery of a signal will change the state of flip-flop circuit 21. When a signal is received through the lead 37, it is delivered to the NOR circuit 10 and drives this NOR circuit to a state where it delivers no output. No output from NOR circuit 10 means no input to NOR circuit 11. Therefore, NOR circuit 11 does not receive an input through conductor 38 and input lead 27. Further, it has been shown that NOR circuit 18 is not delivering an output, therefore, NOR circuit 11 does not receive an input through conductor 46 and input lead 26. Consequently NOR circuit 11 will deliver an output to its output lead 28. An output from NOR circuit 11 means an input to NOR circuit 13. Since an input is controlling, NOR circuit 13 will be driven to a state where it delivers no output.

Since NOR circuit 10 is not delivering an output, there will be no input to NOR circuit 12 through conductors 38, 39 and input lead 27. However, it has been established that NOR circuit 17 is delivering an output and therefore delivers a signal through conductor 47 and input lead 26 to NOR circuit 12. When NOR circuit 12 receives an input from NOR circuit 17, it ceases to deliver an output and there will be no input delivered through conductor 41 and input lead 27 to NOR circuit 14. No input means an output. Therefore, NOR circuit 14 will now deliver an output and a signal will be delivered through output lead 28, conductor 49 to input lead 26 of the NOR circuit 13. NOR circuit 13 receives two input signals and ceases to deliver an output.

There has been a complete reversal in phase of the flip-flop circuit 21. The flip-flop circuit 21 has reached the state shown in F of the chart, that is, there is no output from NOR circuit 13 but an output from NOR circuit 14. Again there will be a signal through lead 56.

The binary counter will be in a stable state and no further change will take place until the signal is discontinued. The interruption of the signal will not effect a reversal of phase of the flip-flop circuit 21 but will cause a reversal of phase of the flip-flop circuit 22. When the signal is interrupted, NOR circuit 10 will deliver an output. The output from NOR circuit 10 will mean an input through conductors 38 and 39 and lead 27 to the NOR circuit 12. A signal to NOR circuit 12 means no output and consequently no input through conductors 41 and lead 27 to the NOR circuit 14. Prior to the interruption of the signal, the NOR circuit 12 was receiving a signal from the NOR circuit 17 through conductor 47 and lead 26. Therefore, there has been no change in state of the NOR circuit 12. No change in state of the NOR circuit 12 means that NOR circuit 14 will not be changed in state. Prior to the interruption of the signal NOR circuit 14 was delivering an output and a signal through output lead 28, conductor 49 and input lead 26 to the NOR circuit 13. A signal is controlling and therefore NOR circuit 13 will be maintained in a state where it will not deliver an output. After the interruption of the signal NOR circuit 14 will continue to deliver an output and NOR circuit 13 will not deliver an output.

When the signal is interrupted the NOR circuit 13 will not deliver an output. Therefore NOR circuit 15 will not receive an input through conductor 42 and input lead 27. It is not receiving an input through input lead 26 since the signal has been interrupted. Therefore NOR circuit 15 will deliver an output. Consequently, a signal will be delivered through output lead 28 of NOR circuit 15, conductor 44 and input lead 27 to NOR circuit 17. The signal drives the NOR circuit 17 to a state where it ceases to deliver an output. Therefore, NOR circuit 18 will not receive a signal from NOR circuit 17 through conductor 50 and input lead 26.

As has been shown, NOR circuit 14 is delivering an output. The output delivered by NOR circuit 14 will be received by NOR circuit 16 through conductor 43 and input lead 27. When NOR circuit 16 receives an input it ceases to deliver an output and NOR circuit 18 will not receive an input through conductor 45 and lead 27. Since NOR circuit 18 is not receiving inputs through either of its leads 26 or 27, it will deliver an output. The output from NOR circuit 18 will be delivered through its output lead 28, conductor 51, input lead 26 to NOR circuit 17. NOR circuit 18 will also deliver an output through lead 28, conductor 46 to the input lead 26 of the NOR circuit 11.

From the foregoing it will be evident that there has been a complete reversal of phase of the flip-flop circuit 22 and the binary counting system is now in state G of the chart. Both of the flip-flop circuits 21 and 22 will remain in this state until another signal is delivered. The delivery of another signal will set up the state described for H of the chart which is equivalent to state D.

In the operation of the binary counting system every time there is a reversal of phase of the flip-flop circuit system 21, there will be a signal sent out either through lead 55 or lead 56. When the flip-flop circuit system 21 is in the state where the NOR circuit 13 is delivering an output and the NOR circuit 14 not delivering an output, the signal will be sent out through lead 55. When the reversal of phase occurs and the NOR circuit 14 is delivering an output but the NOR circuit 13 is not delivering an output, the signal will be sent out through lead 56.

The binary counter system described will thus count in the radix of 2. The counting is effected through leads 55 and 56. When a signal is sent out through lead 55 the counting may be 1 and then through lead 56 it will be 0. As the binary counter alternates in sending out signals through 55 and 56 the counting proceeds as long as signals are being delivered through lead 37.

Since certain changes may be made in the above construction and different embodiments of the invention could be made without departing from the scope thereof, it is intended that all matter contained in the above description or shown in the accompanying diagrams shall be interpreted as illustrative and not in a limiting sense.

I claim as my invention:

1. In a binary counter system which responds to signals from a signal source, in combination, a plurality of transistor NOR circuits having input and output leads, one of said NOR circuits comprising an inversion circuit, said inversion circuit being disposed to receive signals from the signal source and transmit certain of them to the other NOR circuits, a certain plurality of the NOR circuits being connected in circuit relationship in pairs to provide a plurality of isolation circuit systems, the remaining plurality of the NOR circuits being connected in circuit relationship in pairs with the output lead of each NOR circuit in a pair connected to the input lead of the other NOR circuit of the pair to provide a plurality of flip-flop circuit systems, the isolation circuit systems and the flip-flop circuit systems being connected in alternative circuit relationship with the input leads of one connected to the output leads of another, an isolation circuit system leading in the alternatively connected circuit system, the leading isolation circuit system having one input lead of each of its NOR circuits connected to an output lead of the NOR type inversion circuit disposed to receive signals from the signal source, and the other isolation circuit system having one input lead of each of its NOR circuits connected to receive signals from the signal source.

2. In a binary counter system which responds to signals from a signal source, in combination, a plurality of transistor NOR circuits having input and output leads, one of said NOR circuits comprising an inversion circuit, said inversion circuit being disposed to receive signals from the signal source and transmit certain of them to the other NOR circuits, a certain plurality of the NOR circuits connected in circuit relationship in pairs to provide a plurality of isolation circuit systems, the remaining plurality of the NOR circuits being connected in circuit relationship in pairs with the output lead of each NOR circuit in a pair connected to the input lead of the other NOR circuit of the pair to provide a plurality of flip-flop circuit systems, the isolation circuit systems and the flip-flop circuit systems being connected in alternative circuit relationship with the input leads of one connected to the output leads of another, an isolation circuit system leading in the alternatively connected circuit system, the leading isolation circuit system having one input lead of each of its NOR circuits connected to an output lead of the NOR type inversion circuit disposed to receive signals from the signal source, the other isolation circuit system having one input lead of each of its NOR circuits connected to receive signals from the signal source, and means for delivering output currents from each of the NOR circuits of the flip-flop system following the leading isolation circuit system to utilize the counting operation effected by the system.

3. In a binary counter system which responds to signals from a signal source, in combination, a plurality of transistor NOR circuits having input and output leads, a certain plurality of the NOR circuits being connected in circuit relationship in pairs to provide a plurality of isolation circuit systems, a certain plurality of the NOR circuits being connected in circuit relationship in pairs with the output lead of each NOR circuit of a pair connected to the input lead of the other NOR circuit in the pair to provide a plurality of flip-flop circuit systems, the isolation circuit systems and the flip-flop circuit systems being connected in alternative circuit relationship with the input leads of one connected to the output leads of another, an isolation circuit system leading in the alternatively connected circuit system, a transistor NOR unit comprising an inversion circuit disposed to receive signals from the signal source and transmit them to the input leads of the NOR circuits in the leading isolation circuit system, and means connecting one input lead of each of the NOR circuits of the other isolation circuit system to the signal source.

4. In a binary counter system which responds to signals from a signal source, in combination, a plurality of transistor NOR circuits having input and output leads, a certain plurality of the NOR circuits being connected in circuit relationship in pairs to provide a plurality of isolation circuit systems, a certain plurality of the NOR circuits connected in circuit relationship in pairs with the output lead of each NOR circuit of a pair connected to the input lead of the other NOR circuit in the pair to provide a plurality of flip-flop circuit systems, the isolation circuit systems and the flip-flop circuit systems being connected in alternative circuit relationship with the input leads of one connected to the output leads of another, an isolation circuit system leading in the alternatively connected circuit system, a transistor NOR unit comprising an inversion circuit disposed to receive signals from the signal source and transmit them to the input leads of the NOR circuits in the leading isolation circuit system, means connecting one input lead of each of the NOR circuits of the other isolation circuit system to the signal source, and means provided in combination with one of the NOR circuits of the flip-flop circuit system next to the leading isolation circuit system for predetermining the sequence of operation of the flip-flop system in response to a delivery of signals from the signal source.

5. In a binary counter system which responds to signals from a signal source, in combination, a plurality of transistor NOR circuits having input and output leads, a certain plurality of the NOR circuits being connected in circuit relationship in pairs to provide a plurality of isolation circuit systems, a certain plurality of the NOR circuits being connected in circuit relationship in pairs with the output lead of each NOR circuit of a pair connected to the input lead of the other NOR circuit in the pair to provide a plurality of flip-flop circuit systems, the isolation circuit systems and the flip-flop circuit systems being connected in alternative circuit relationship with the input leads of one connected to the output leads of another, an isolation circuit system leading in the alternatively connected circuit system, an inversion transistor NOR type circuit disposed to receive signals from the signal source and transmit them to the input leads of the NOR circuits in the leading isolation circuit system, means connecting one input lead of each of the NOR circuits of the other isolation circuit system to the signal source, means provided in combination with one of the NOR circuits of the flip-flop circuit system next to the leading isolation circuit system for predetermining the sequence of operation of the flip-flop system in response to a delivery of signals from the signal source, and means for delivering output currents from each of the NOR circuits of the flip-flop system following the leading isolation circuit system to utilize the counting operation effected by the system.

6. In a binary counter system which responds to signals from a signal source, in combination, a plurality of temperature compensated transistor NOR circuits having input leads and output leads, a power source for the temperature compensated NOR circuits, means connecting the temperature compensated NOR circuits to the power source, means connecting the output lead of each of a pair of temperature compensated NOR circuits to the input leads of the other of the pair of temperature compensated NOR circuits to provide flip-flop circuit systems, NOR circuits grouped in pairs with an output lead of each connected to an input lead of each of the temperature compensated NOR circuits of the flip-flop circuit systems, the temperature compensated NOR circuits grouped in pairs serving to isolate the flip-flop circuit systems from receiving direct input signals, a temperature compensated inversion circuit connected, including a transistor NOR unit, to receive signals from the signal cource and for transmitting them to the first pair of temperature compensated NOR circuits provided for isolating the first flip-flop circuit system, means for connecting the input leads of the second pair of temperature compensated NOR circuits provided for isolating the second flip-flop circuit system, and means for connecting the output leads of the temperature compensated NOR circuits of the second flip-flop circuit system to the input leads of the first pair of temperature compensated NOR circuits provided for isolating the first flip-flop circuit system.

7. In a binary counter system which responds to signals from a signal source, in combination, a plurality of temperature compensated transistor NOR circuits having input leads and output leads, a power source for the temperature compensated NOR circuits, means connecting the temperature compensated NOR circuits to the power source, means connecting the output lead of each of a pair of temperature compensated NOR circuits to the input leads of the other of the pair of temperature compensated NOR circuits to provide flip-flop circuit systems, NOR circuits grouped in pairs with an output lead of each connected to an input lead of each of the temperature compensated NOR circuits of the flip-flop circuit systems, the temperature compensated NOR circuits grouped in pairs serving to isolate the flip-flop circuit systems from receiving direct input signals, a temperature compensated inversion circuit connected to receive signals from the signal source and for transmitting them to the first pair of temperature compensated NOR circuits provided for isolating the first flip-flop circuit system, means for connecting the input leads of the second pair of temperature compensated NOR circuits provided for isolating the second flip-flop circuit system, means for connecting the output leads of the temperature compensated NOR circuits in the second flip-flop circuit system to the input leads of the first pair of temperature compensated NOR circuits provided for isolating the first flip-flop circuit system, and means for delivering a current from either of the temperature compensated NOR circuits of the first flip-flop circuit system to make use of the counting operation of the binary counter.

8. In a binary counter system which responds to signals from a signal source, in combination, a plurality of temperature compensated NOR circuits having input leads and output leads, a power source for temperature compensated NOR circuits, means connecting the temperature compensated NOR circuits to the power source, means connecting the output lead of each of a pair of temperature compensated NOR circuits to the input leads of the other of the pair of temperature compensated NOR circuits to provide flip-flop circuit systems, NOR circuits grouped in pairs with an output lead of each connected to an input lead of each of the temperature compensated NOR circuits of the flip-flop circuit systems, the temperature compensated NOR circuits grouped in pairs serving to isolate the flip-flop circuit systems from receiving direct input signals, a temperature compensated inversion circuit connected to receive signals from the signal source and for transmitting them to the first pair of temperature compensated NOR circuits provided for isolating the first flip-flop circuit system, means for connecting the input leads of the second pair of temperature compensated NOR circuits provided for isolating the second flip-flop circuit system, means for connecting the output leads of the temperature compensated NOR circuits of the second flip-flop circuit system to the input leads of the first pair of temperature compensated NOR circuits provided for isolating the first flip-flop circuit system, means for delivering a current from either of the temperature compensated NOR circuits of the first flip-flop circuit system to make use of the counting operation of the binary counter, and means for connecting an input lead of one of the temperature compensated NOR circuits of the first flip-flop circuit system to the power source to assure a predetermined sequence of functioning of the binary counter.

9. A binary counter comprising first and second isolation circuits and first and second flip-flop circuits, means for applying the signals to be counted to the input of each said first and second isolation circuits, means in said first isolation circuit for controlling said first flip-flop circuit to change its state of conduction responsive to the receipt of each signal to be counted, and means in said second isolation circuit for controlling said second flip-flop circuit to change its state of conduction responsive to the termination of each signal to be counted.

References Cited in the file of this patent

UNITED STATES PATENTS

| | | |
|---|---|---|
| 2,518,499 | Smith | Aug. 15, 1950 |
| 2,665,845 | Trent | Jan. 12, 1954 |
| 2,770,725 | Lentz | Nov. 13, 1956 |
| 2,813,676 | Boyer | Nov. 19, 1957 |
| 2,817,481 | Beesley | Dec. 24, 1957 |
| 2,823,856 | Booth | Feb. 18, 1958 |
| 2,868,455 | Bruce | Jan. 13, 1959 |